United States Patent [19]

Nakamoto

[11] 3,871,025

[45] Mar. 11, 1975

[54] TAPE LOADING SYSTEM FOR AUTOMATICALLY WITHDRAWING A TAPE FROM A CASSETTE AND ENGAGING THE TAPE WITH A RECORDING AND/OR REPRODUCING HEAD

[75] Inventor: Soji Nakamoto, Osaka, Japan

[73] Assignee: Sanyo Electric Co., Ltd., Osaka, Japan

[22] Filed: May 25, 1973

[21] Appl. No.: 363,844

[30] Foreign Application Priority Data

June 1, 1972 Japan .............................. 47-54836

[52] U.S. Cl. ...................................... 360/85, 360/95

[51] Int. Cl. ......................... G11b 15/66, G11b 5/52

[58] Field of Search ........ 179/100.2 ZA; 360/85, 95

[56] References Cited

UNITED STATES PATENTS 3,721,776 3/1973 Inaga ........................ 179/100.2 ZA 3,800,314 3/1974 Sato ..................................... 360/85

*Primary Examiner*—Vincent P. Canney

*Assistant Examiner*—Robert S. Tupper

*Attorney, Agent, or Firm*—Armstrong, Nikaido & Wegner

[57] ABSTRACT

A magnetic tape is drawn out from a cassette by a pinch roller universally mounted on a rotatable guide member surrounding a guide cylinder member around which the magnetic tape should be loaded. The pinch roller, guided by a guide frame member disposed around the rotatable guide member, transports the magnetic tape cooperating with a capstan at the final tape loaded position. Disposed on the rotatable guide member are guide pin means individually mounted on an axis substantially parallel to the plane of the rotatable loop member. The guide pin means operate to avoid tangling of the magnetic tape in the loading process and in recording or reproducing mode.

12 Claims, 6 Drawing Figures

TAPE LOADING SYSTEM FOR AUTOMATICALLY WITHDRAWING A TAPE FROM A CASSETTE AND ENGAGING THE TAPE WITH A RECORDING AND/OR REPRODUCING HEAD

BACKGROUND OF THE INVENTION

1. Field of the Invention

The present invention relates to an automatic tape loading system for magnetic recording and/or reproducing apparatus, especially video tape recorders of the helical scanning type.

2. Description of the Prior Art

Automatic tape loading systems for magnetic recording and/or reproducing apparatus for a dual stage type magnetic tape cassette with a support ring with guiding rollers or pins on it surrounding a guide drum are known in the prior art as for example in U.S. Pat. No. 3,643,038.

In the dual stage type magnetic tape cassette the tape runs on a slant between a supply reel and a take-up reel mounted in the cassette in a vertically coaxial relationship with each other.

In the prior art, however, no consideration is found for the tape tangling in the loading process and partial stretch of the tape which causes skew distortion.

SUMMARY OF THE INVENTION

The present invention relates to an automatic tape loading system for magnetic recording and/or reproducing apparatus such as video tape recorders of the helical scanning type. The tape loading system comprises cylindrical guide means mounted on a base member, a rotatable loop member surrounding the cylindrical guide means, a pinch roller rotatably mounted on an axis which is universally mounted on the rotatable loop member, guide pin means disposed on the rotatable loop means, and first guide frame means for guiding the pin means so that they may guide the magnetic tape along the cylindrical guide means. A second guide frame means guides the pinch roller so that it may draw the magnetic tape out of a cassette along the cylindrical guide means.

It is the object of the present invention to provide an automatic tape loading system for magnetic recording and/or reproducing apparatus of the helical scanning type which can avoid tape tangle and partial stretching of the tape which causes skew distortion.

It is another object of the present invention to provide a simplified automatic tape loading system for a magnetic recording and/or reproducing apparatus of the helical scanning type without any auxiliary tape drawing mechanism.

BRIEF DESCRIPTION OF THE DRAWINGS

FIG. 6 shows partial plan view of a mechanism for pressing a pinch roller to a capstan with the magnetic tape between.

DESCRIPTION OF THE PREFERRED EMBODIMENT

Figure 1:
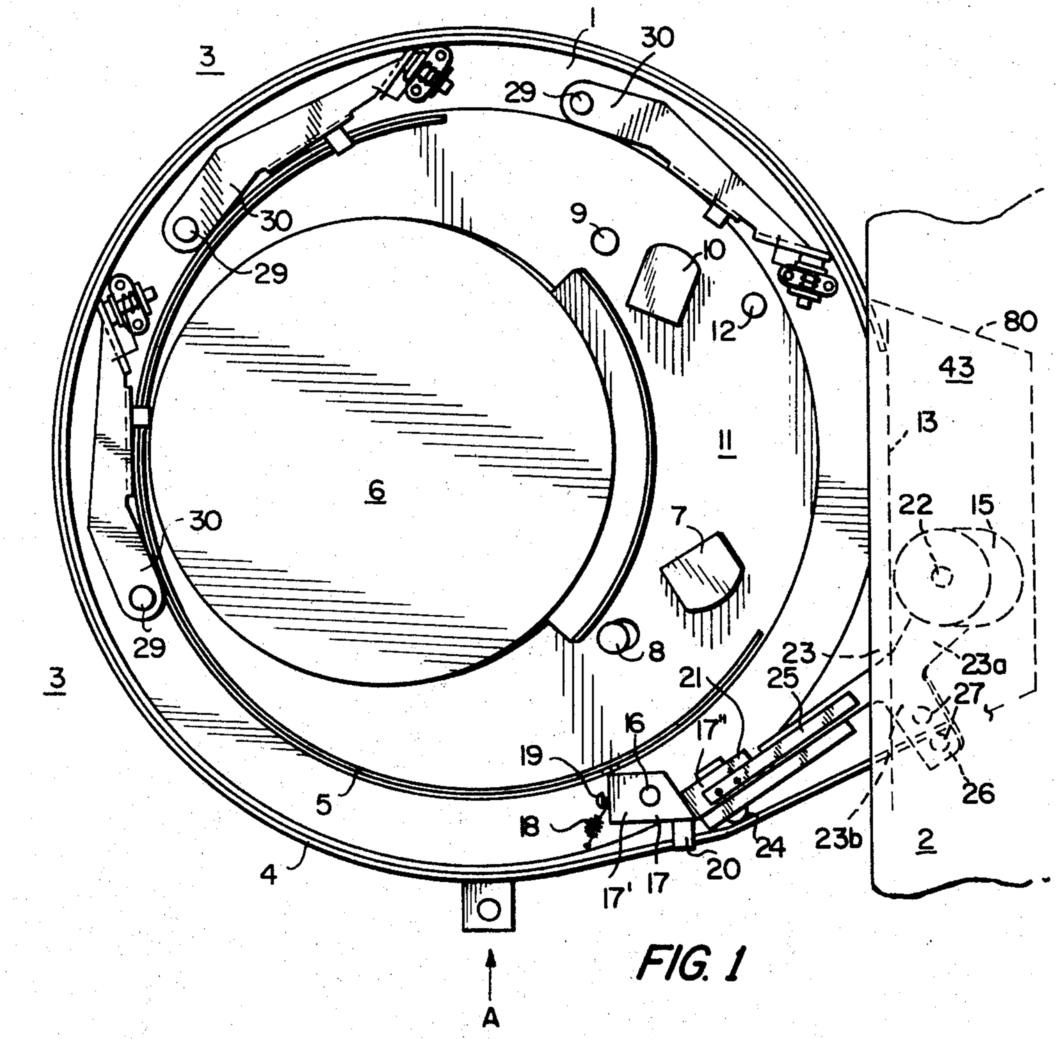
FIG. 1 shows a plan view of the present invention in the pre-loading position.

Referring to FIGS. 1 to 4, in which numeral 1 shows a rotary loop member plate ring which is rotatably supported by three pulleys 14 (see FIG. 5) made of resilient material such as synthetic rubber or by three metal or plastic gears rotatably mounted on a base member 11.

The rotary loop member 1 is rotated both clockwise or counterclockwise following the loading or unloading mode by reduction gears energized by an electric motor (not shown).

On the rotary loop member 1 are mounted a pinch roller mechanism 2 and guide pin means 3 individually guided by a guide frame 4 disposed along the outer periphery of the rotary loop member 1 and by a guide frame 5 disposed along the inner periphery of the rotary loop member 1.

Disposed within the rotary loop member 1, is a cylindrical guide means 6 equipped with rotary magnetic head or heads 45, an erasing head 7, a pair of tape guides 8 and 9 and a complex audio and control signal head 10, all of which are mounted on the base member 11.

A capstan 12 is disposed next to the complex head 10 and connected with a constant speed rotating mechanism (not shown) as in an ordinary tape recorder. The cylindrical guide means 6 is mounted on the base member 11 slightly slantingly with respect to its vertical position in order to conform to the helical path of the tape along the locus of the rotary magnetic head (as shown in the chain line in FIG. 4).

Accordingly the tape guide 8 and the erasing head 7 should be also set slanting along the path of the tape at the entry side to the cylindrical guiding means 6.

The tape guide 9, complex audio-control signal head 10 and the capstan 12 are vertical with respect to the base member 11 due to the slant arrangement of the cylindrical guiding means 6.

Figure 2:
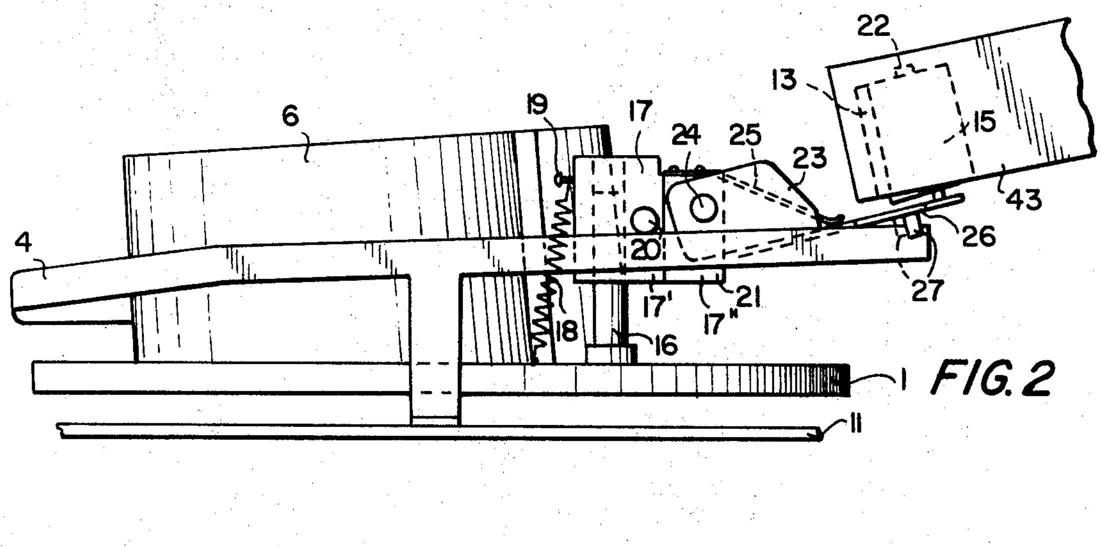
FIG. 2 is the side view of FIG. 1.

Referring to FIGS. 1 and 2, the pinch roller 15 is universally mounted on the rotary loop member 1. In more detail the pinch roller 15 is capable of revolving in plane parallel to the rotary loop member 1, and in the plane perpendicular to the rotary loop member 1 and in addition movable in parallel with a third axis 16 fixed perpendicular to the rotary loop member 1.

The axis 16, embeded into or mounted on the rotary loop member 1, carries a slide member 17 of a block shape not always rotatable around it but slidably along its axis. The slide member 17 is biased downward by a spring 18 fixed to the rotary loop member 1 so that a pin member 20 embeded into the slide member 17 may engage the top side of the guide frame 4. The slide member 17 consists of two block members namely a trapezoidal block 17' and rectangular block 17''. On the side wall of the solid block 17'' is mounted a supporting member 23 rotatable around a second axis 24.

The supporting member 23 has an extended portion which splits into two portions **23*a* and 23*b* and is biased downward by a plate spring 25, one side of which is fixed to the solid block 17''. On the portion 23*a* is a first axis 22 which carries the pinch roller 15**.

The other portion **23*b* which stretches almost perpendicular to the extended portion has a pair of guide pins 27 beneath it for engaging the guide frame 4 in order to control the horizontal movement of the pinch roller 15**.

Figure 3:
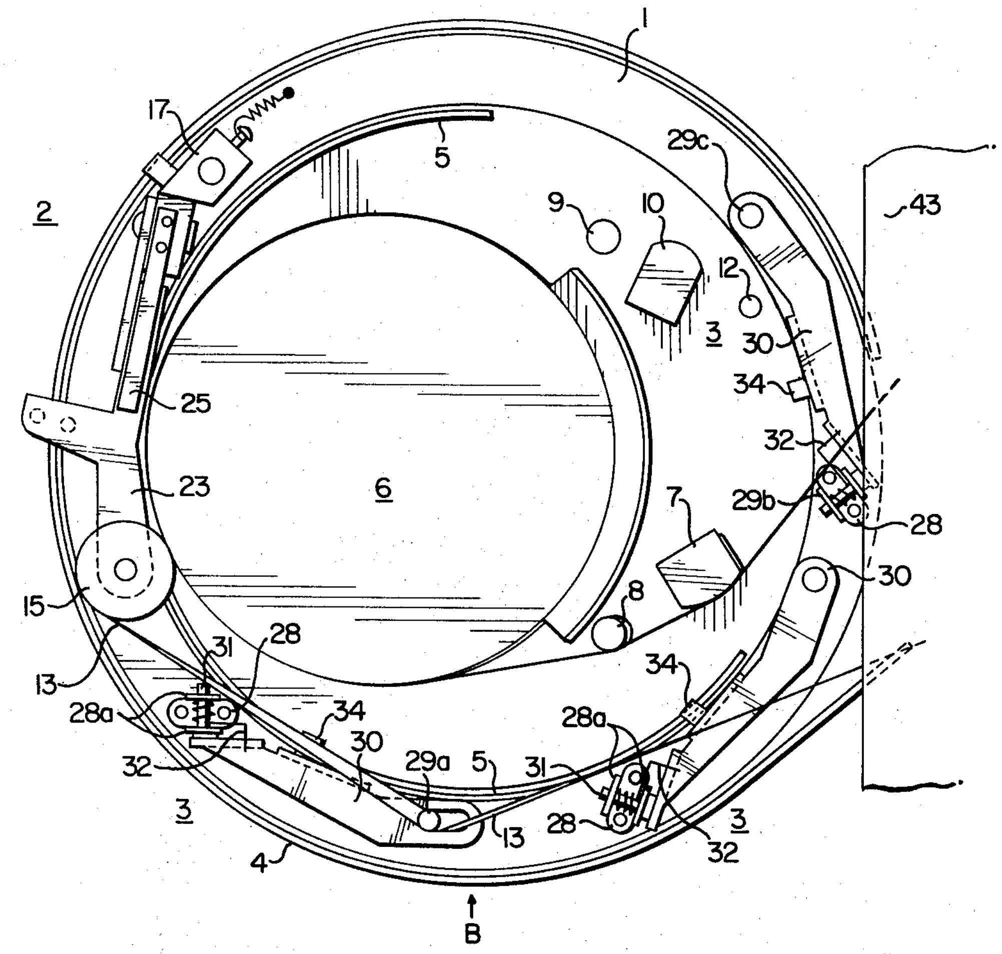
FIG. 3 shows a plan view of the present invention in the process of tape loading.
Figure 4:
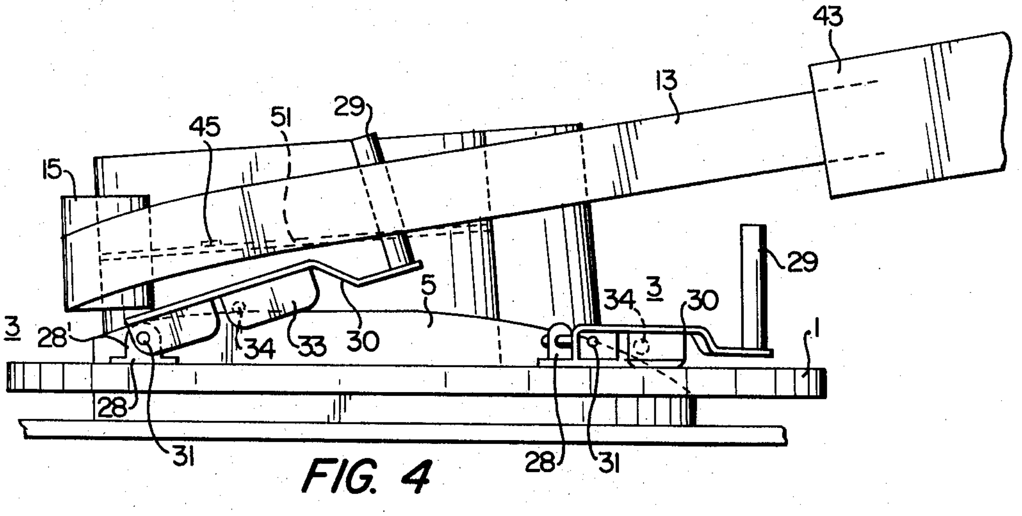
FIG. 4 is the side view of FIG. 3.

Referring to FIGS. 3 and 4, guide pin means are described in more detail.

As shown in FIG. 3, pillow blocks 28 are fixed on the rotary loop member 1 each bearing a supporting plate means 30. A coil spring 32 which is mounted between bearing pieces **28*a* engaging the axis 31, biases the supporting plate means in the clockwise direction so that a guide projection 34 may engage the guide frame 5 to control the movement of the guide pin means 29**

Though, all guide pins 29 are observed as having a cylindrical shape in the drawings, it should be noted that at least the guide pin **29*a*** is formed as a conical shape so that the magnetic tape may run smoothly following the guided path.

Figure 5:
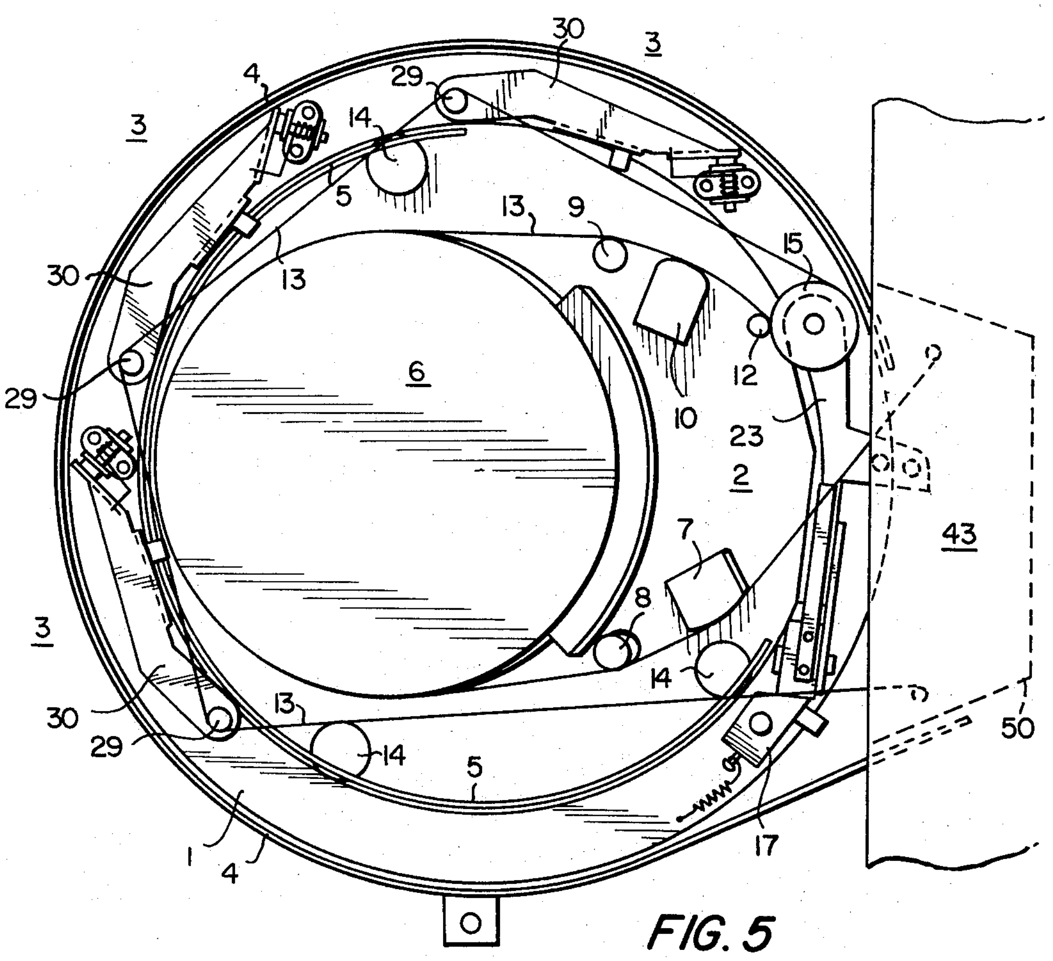
FIG. 5 shows a plan view of the present invention in the tape-loaded position.

Referring to FIGS. 4 and 5 the guide frame 4 disposed along the periphery of the rotary loop member 1, controls the movement of the pinch roller 15 in accordance with the required process such as tape drawing out process and tape loading process. In the first step of the loading process, the pinch roller 15 rests on the outer side of the tape as shown in dotted line in FIG. 1. Since the pinch roller 15 operates as tape drawing guide in the beginning, the guide frame 4 should be designed to guide the pinch roller linearly and to drop down gradually to the plane along which the tape should be loaded. The height of the guide frame 4 is the lowest at its loaded end where the pinch roller 15 contacts the capstan 12.

The guide frame 5, disposed along inner periphery of the rotary loop member 1, controls the movement of guide pin means 3 which rests beneath the level of the cassette at least at pre-loading position. The top and guiding side of the guide frame 5 is so designed that the first guide pin **29*a* may rise up to the tape path when the pinch roller 15 has drawn a certain length of the tape out of the cassette 43**.

Considering the requirement for the guide pin means 3, the guide frame 5, is clearly shown in the side view in FIG. 4 where the level of the top side of the guide frame 5 is designed to be lowest at the tape drawing position nearest to the cassette position and to be highest at the position where the magnetic tape contacts and is loaded. This position is followed by a predetermined tape loading curve for helical scanning by the magnetic heads.

Figure 6:
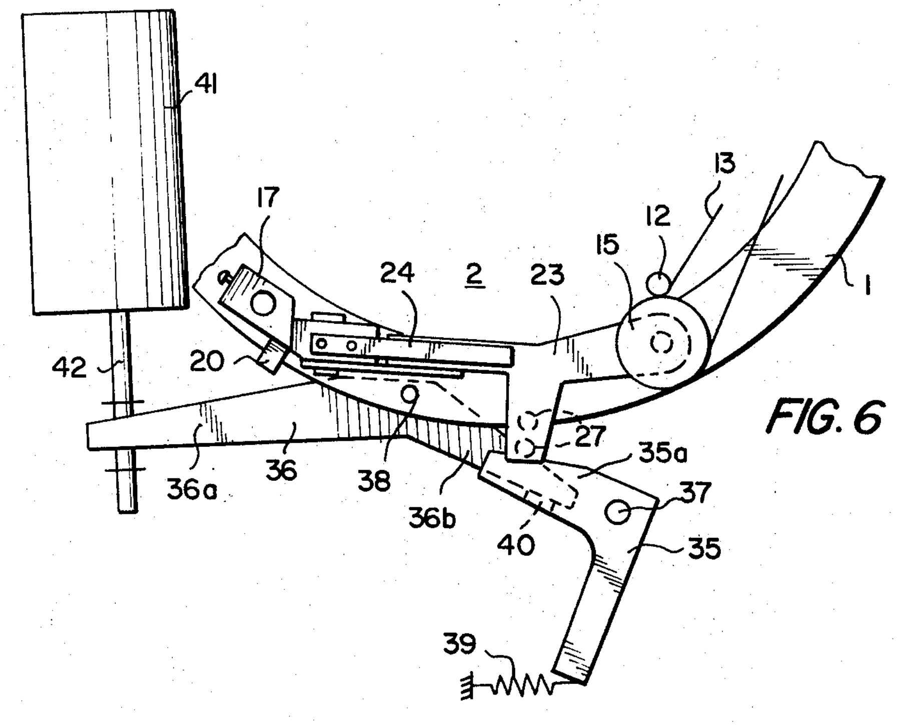

The mechanism for pressing the pinch roller 15 to the capstan 12 is disclosed in FIG. 6.

At the tape loaded position where the pinch roller 15 draws near to the capstan 12 it is pivoted by L-shaped lever 35 which has a tapered portion on its short arm 35 and is biased clockwise around the axis 37 by a spring 39.

The short arm **35*a* has a folded portion 40 which engages with a wing 36*b* of a release lever 36 pivoted on an axis 38**.

The other wing **36*a* of the release lever 36 is connected to electric plunger 42 operated by a solenoid 41**.

When the rotary loop member 1 rotates in the loading (clockwise) direction and approaches the final loaded position, one of guide pins 27 engages the tapered portion of the L-shaped lever 35 against biasing by the spring 39. Thus, the pinch roller 15 is pressed to the capstan 12 with moderate pressure with the magnetic tape between them.

For temporary release of the pinch roller 15 for the purpose of still reproduction and the like, the electric plunger 42, operated by the solenoid 41 which can be controlled by remote-control signal, pulls the release lever in clockwise direction and releases the L-shaped lever 35 from the guide pin 27. This reduces the pressure of the pinch roller 15 on the capstan 12.

In operation referring to FIGS. 1 and 2 which show the pre-loading position of the system where the pinch roller 15 rests on the opposite side of the tape in the opening 50 of the cassette disposed at the bottom front of the cassette 43. At this position the axis 22 of the pinch roller 15 should be parallel to the surface of the tape 13 (see FIG. 2) so that the pinch roller draws it without tangling and partial stretching. With the rotation of the rotary loop member 1 in clockwise direction, the magnetic tape 13 in the cassette is drawn out gradually from the cassette 43 in loop form without looseness.

In order to load the tape around the cylindrical guiding means 6 so that the tape crosses the scanning locus 51 of magnetic heads 45 and so that the magnetic heads trace a slanted track on the magnetic tape, the magnetic tape should be shifted gradually downward.

At this point uniform contact between the periphery of the pinch roller and the magnetic tape is the key to avoid partial stretching of the tape. For this purpose both slide member 17 and the first supporting member 23 are forced downward individually by the coil spring 18 or by the plate spring 25 so that the pin member 20 and the pair of guide pins 27 follow the guide frame 4. The guiding side is designed in consideration of the requirement mentioned above.

On the other hand a series of guide pins 29 follows the ascending part of the guide frame 5 with guide projection 34 and thereby the magnetic tape 13, as shown in FIG. 4. In FIG. 4 the first guide pin has just contacted the magnetic tape 13 and following guide pin 29 is ascending.

With the further rotation of the rotary loop member 1 in the clockwise direction, the pinch roller 15 gradually goes down following to the guide frame 4 making a path around the cylindrical guide 6 in predetermined slant relation to the locus 51 of magnetic heads 45 as shown in FIG. 5. At the same time the guide pins 29 following the top guiding side of the guide frame 5 with their guide projection portion 34 which is biased downward by the spring 32 descends gradually to avoid contacting tape running in the reverse direction.

The arrangement of the whole structure and relation to the tape at the loaded position is clearly shown in FIG. 5. The position the tape 13 running out of the cassette 43 passes the erasing head 7 and the slant fixed guide 8 which maintains smooth contact of the tape to the cylindrical guide means 6.

After passing through and around the magnetic heads tracing an area more than 180° where the tape is guided in a helical manner so that the magnetic heads slantingly trace on the tape the tape runs through the fixed guide 9 and the complex audio-control signal head 10 and then is drawn by the capstan 12 with the help of the pinch roller 15 at a constant speed. The tape passes the lowest level at that position and returns to the cassette by way of a series of guide pins 29 changing its angle and direction.

In order to make the tape run more smoothly the guide pin **29*a*** of a conical shape will be adapted.

For unloading the tape it is enough to rotate the rotary loop member 1 in a counterclockwise direction and to rotate the reel or reels of the cassette in order to wind loose tape during the unloading process.

The above are the descriptions about a preferred embodiment of the present invention, but it is easily understood by those skilled in the art that it is possible to carry out modifications of the form and arrangement of the members without going beyond the scope of the spirit of the present invention in addition to the above described embodiment. Therefore, it should be understood that the following scope of claim for patent is aimed to include all those modifications as mentioned above falling into the scope of the present invention.

What is claimed is:

1. An automatic magnetic tape loading system for magnetic recording and/or reproducing apparatus comprising, a. at least one rotating magnetic head;

b. cylindrical tape guide means mounted on a base member for guiding a magnetic tape on its surface said cylindrical tape guide means having a circumferential gap along which said at least one rotary magnetic head scans, as said magnetic tape moves along said tape guide means crossing said gap;

c. a rotatable loop means surrounding said cylindrical tape guide means in an eccentric relationship therewith;

d. means for rotating said loop means;

e. pinch roller means rotatably mounted on a first axis means disposed on a first supporting member rotatably carried by a second axis means on a second supporting member mounted on a third axis means mounted on said rotatable loop means whereby said pinch roller means is movable in three dimensions and said pinch roller means engages said tape in a cassette and withdraws said tape therefrom;

f. a plurality of guide pin means each mounted on a supporting plate means mounted by a pillow block on said rotatable loop means and each moving independently with respect to said rotatable loop means;

g. first guide frame means for guiding said guide pin means such that said pin means guides the magnetic tape along said cylindrical guide means crossing said gap upon rotation of said loop means; and h. second guide frame means for guiding said pinch roller means such that said pinch roller draws the magnetic tape out of the cassette and moves it along said cylindrical guide means upon rotation of said loop means.

2. An automatic magnetic tape loading system for magnetic recording and/or reproducing apparatus as set forth in claim 1 wherein said rotatable loop means is supported by at least three rotary members of a resilient material.

3. An automatic magnetic tape loading system for magnetic recording and/or reproducing apparatus as set forth in claim 1, wherein said pinch roller means is disposed at the opposite side of the tape in relation to said cylindrical guide means at a starting position.

4. An automatic magnetic tape loading system for magnetic recording and/or reproducing apparatus comprising a. rotating magnetic head means for scanning said magnetic tape;

b. cylindrical tape guide means mounted on a base member, said cylindrical tape guide means having a circumferential gap along which said at least one rotating magnetic head means scans wherein a magnetic tape moves along said tape guide means crossing said gap;

c. a rotating loop member surrounding said cylindrical guide means;

d. means for rotating said loop member;

e. a pinch roller means rotatably mounted on a first axis means fixed on a first supporting member said supporting member including guide piece means for holding a second guide frame means, the first supporting member rotatably mounted on a second axis means fixed on a second supporting member mounted on a third axis means fixed on the rotatable loop members, whereby the pinch roller means is movable in three dimensions and engages a tape and draws it from a cassette;

f. a plurality of guide pin members each individually fixed on a supporting plate and independently movable with respect to each other said supporting plate being movably mounted on the loop member;

g. first guide frame means disposed along inner periphery of the rotatable loop means for guiding said guide pin means along its guiding curve whereby the magnetic tape is guided along the cylindrical guide means without tangling upon rotation of said loop member;

h. the second guide frame means being disposed along the outer periphery of the rotatable loop means for guiding said pinch roller means along its guiding curve whereby the magnetic tape is drawn out of the cassette and along the cylindrical guide means upon rotation of said loop member.

5. An automatic magnetic tape loading system for magnetic recording and/or reproducing apparatus comprising:

a. at least one rotating magnetic head means;

b. cylindrical tape guide means mounted on a base member, wherein said rotating magnetic head means scan the magnetic tape along said cylindrical tape guide means;

c. a rotating loop member surrounding said cylindrical tape guide means eccentrically related to the center of said cylindrical tape guide means;

d. means for rotating said loop member;

e. a pinch roller means rotatably mounted on a first axis means fixed on a first supporting member said first supporting member having a guide piece means holding second guide frame means, the first supporting member rotatably mounted on a second axis means fixed on a second supporting member said second supporting member mounted on a third axis means fixed on the rotatable loop member, whereby the pinch roller is movable in three dimensions;

f. a plurality of guide pin members each individually fixed on a supporting plate and each independently movable with respect to each other said supporting plate being movably mounted on the loop member;

g. first guide frame means disposed along the inner periphery of the rotatable loop means for guiding said guide pin means along its guiding curve whereby the magnetic tape is guided along the cylindrical guide means without tangling upon the rotation of said loop member;

h. second guide frame means disposed along the outer periphery of the rotatable loop means for guiding said pinch roller along its guiding curve whereby the magnetic tape is drawn out of the cassette and along the cylindrical guide means upon the rotation of said loop member; and i. means for automatically pressing the pinch roller to the capstan with the tape inbetween at the end of tape loading process.

6. An automatic magnetic tape loading system for magnetic recording and/or reproducing apparatus comprising:

a. at least one rotating magnetic head means;

b. cylindrical tape guide means mounted on a base member, said cylindrical tape guide means having a circumferential gap along which said at least one rotating magnetic head means scans, wherein a magnetic tape moves along said guide means crossing said gap;

c. a rotatable loop member surrounding said cylindrical tape guide means in an eccentric relation to the axis of said cylindrical tape guide means;

d. means for rotating said loop means;

e. pinch roller means rotatably mounted on a first axis means fixed on a first supporting member and movable around a second axis means on a second supporting member carried by a third axis means fixed on said rotatable loop member, whereby the pinch roller means is movable in three dimensions;

f. a plurality of guide pin members fixed on supporting plate means each guide pin member being independently movable with respect to each other wherein said supporting plate means are movably mounted on said rotatable loop means;

g. first guide frame means disposed along the inner periphery of said rotatable loop means for guiding said guide pin means such that said guide pin means guides said magnetic tape without tangling upon rotation of said loop means; and h. second guide frame means disposed along the outer periphery of said rotatable loop means for guiding said pinch roller means such that said pinch roller means draws said magnetic tape out of said cassette and along said cylindrical guide means upon rotation of said loop means.

7. An automatic magnetic tape loading system for magnetic recording and/or reproducing apparatus as set forth in claim 6, wherein said rotatable loop member is disposed in an eccentric relation to the axis of said cylindrical guide means wherein said rotatable loop member is supported by at least three rotary members made of resilient material.

8. An automatic magnetic tape loading system for magnetic recording and/or reproducing apparatus as set forth in claim 6, wherein said pinch roller means is disposed at the opposite side of the tape in relation to said cylindrical guide means at a starting position.

9. An automatic magnetic tape loading system for magnetic recording and/or reproducing apparatus as in claim 6, wherein said first supporting member includes a pair of guide pieces and a spring biasing means for engaging said second guide frame means.

10. An automatic magnetic tape loading system for magnetic recording and/or reproducing apparatus as set forth in claim 6, wherein said supporting plate means is movably coupled to said rotatable loop means.

11. An automatic magnetic tape loading system for magnetic recording and/or reproducing apparatus as set forth in claim 6, wherein said plurality of guide pin members include three individual guide pin members each member fixed on a supporting plate movably mounted on an axis which is substantially parallel to the plane of the loop member.

12. An automatic magnetic tape loading system for magnetic recording and/or reproducing apparatus as set forth in claim 11, wherein said supporting plate has a holding means for engaging said first guide frame means.

* * * * *